US008917068B2

United States Patent
Chen et al.

(10) Patent No.: US 8,917,068 B2
(45) Date of Patent: Dec. 23, 2014

(54) QUASI-RESONANT CONTROLLING AND DRIVING CIRCUIT AND METHOD FOR A FLYBACK CONVERTER

(75) Inventors: Shenglun Chen, Hangzhou (CN); Jin Jin, Hangzhou (CN)

(73) Assignee: Silergy Semiconductor Technology (Hangzhou) Ltd, Hangzhou (CN)

( * ) Notice: Subject to any disclaimer, the term of this patent is extended or adjusted under 35 U.S.C. 154(b) by 427 days.

(21) Appl. No.: 13/470,172

(22) Filed: May 11, 2012

(65) Prior Publication Data

US 2012/0299561 A1     Nov. 29, 2012

(30) Foreign Application Priority Data

May 24, 2011    (CN) .......................... 2011 1 0137256

(51) Int. Cl.
G05F 1/40 (2006.01)
H02M 3/335 (2006.01)
H02M 1/00 (2006.01)

(52) U.S. Cl.
CPC ........ *H02M 3/33507* (2013.01); *Y02B 70/1491* (2013.01); *H02M 2001/0058* (2013.01); *Y02B 70/1433* (2013.01)
USPC ....................................... 323/235; 363/21.12

(58) Field of Classification Search
USPC .......... 363/21.12, 21.13, 21.14, 21.15, 21.16, 363/21.17, 21.18; 323/235, 284
See application file for complete search history.

(56) References Cited

U.S. PATENT DOCUMENTS

| | | | | |
|---|---|---|---|---|
| 6,288,501 | B1* | 9/2001 | Nakamura et al. | 315/307 |
| 7,768,802 | B2* | 8/2010 | Lee et al. | 363/21.16 |
| 8,279,634 | B2* | 10/2012 | Lin | 363/21.05 |
| 8,520,416 | B2* | 8/2013 | Xie et al. | 363/21.17 |
| 8,755,203 | B2* | 6/2014 | Li et al. | 363/21.16 |
| 2008/0278974 | A1* | 11/2008 | Wu | 363/21.18 |

* cited by examiner

*Primary Examiner* — Jue Zhang
*Assistant Examiner* — Lakaisha Jackson
(74) *Attorney, Agent, or Firm* — Michael C. Stephens, Jr.

(57) ABSTRACT

The present invention relates to a quasi-resonant controlling and driving circuit and method for a flyback converter. In one embodiment, a controlling and driving circuit for a flyback converter, can include: a differentiation circuit configured to receive a third controlling signal and a drain-source voltage of a main power switch of the flyback converter; where the drain-source voltage is configured to be differentiated by the differentiation circuit to generate a differential voltage when the third controlling signal is active within an interval that the main power switch is shut-off; a valley voltage detection circuit coupled to the differentiation circuit, and configured to receive the differential voltage; and where a valley controlling signal is configured to be generated by the valley voltage detection circuit to achieve quasi-resonant driving for the main power switch of the flyback converter when the differential voltage crosses zero with a positive slope.

16 Claims, 10 Drawing Sheets

FIG. 1A (conventional)

FIG. 1B (conventional)

FIG. 2A (conventional)

FIG. 2B (conventional)

QUASI-RESONANT CONTROLLING AND DRIVING CIRCUIT AND METHOD FOR A FLYBACK CONVERTER

RELATED APPLICATIONS

This application claims the benefit of Chinese Patent Application No. CN201110137256.3, filed on May 24, 2011, which is incorporated herein by reference in its entirety.

FIELD OF THE INVENTION

The present invention generally pertains to a switching power supply, and more particularly to a quasi-resonant controlling and driving circuit and method for a flyback converter.

BACKGROUND

In order to reduce the volume, weight, and noise to improve transient response and achieve high power density, high frequency can be applied for switching converters. To decrease the switching losses for high frequency applications, a soft switching technique may be utilized. By resonant controlling and driving for the power switches, both the voltage and current of the power switches of the switching converter may vary in sinusoidal or quasi-sinusoidal waveform. When the voltage crosses zero, the power switch can be turned on, and when the current crosses zero, the power switch can be turned off. By such operation, the switching losses can be lowered to essentially zero.

The flyback converter may be applied widely for lower power applications. The amplitude of switching frequency may be limited due to capacitive conduction loss of the power switch. There are many ways to achieve soft switching, most of which are unavailable for applications with higher input voltage because the power switch may bear much higher voltage stress. Resonance can occur between the intrinsic body capacitor of the power switch and the primary inductor of the transformer after the inductor current decreases to zero when the inductor current is operated in a discontinuous conduction mode.

SUMMARY

In one embodiment, a controlling and driving circuit for a flyback converter, can include: (i) a differentiation circuit configured to receive a third controlling signal and a drain-source voltage of a main power switch of the flyback converter; (ii) where the drain-source voltage is configured to be differentiated by the differentiation circuit to generate a differential voltage when the third controlling signal is active within an interval that the main power switch is shut-off; (iii) a valley voltage detection circuit coupled to the differentiation circuit, and configured to receive the differential voltage; and (iv) where a valley controlling signal is configured to be generated by the valley voltage detection circuit to achieve quasi-resonant driving for the main power switch of the flyback converter when the differential voltage crosses zero with a positive slope.

In one embodiment, a quasi-resonant soft-switching flyback converter, can include: (i) a controlling and driving circuit as above; and (ii) a flyback power stage including the main power switch, a transformer having primary and secondary windings, and an output diode, where the flyback power stage is configured to generate an output voltage at an output terminal in accordance with an input voltage.

In one embodiment, a method of controlling and driving for a flyback converter, can include: (i) differentiating a drain-source voltage of a main power switch of the flyback converter to generate a differential voltage when a third controlling signal is active and the main power switch is shut-off; (ii) detecting the differential voltage; (iii) generating a valley controlling signal when the differential voltage crosses zero with positive slope; and (iv) turning on the main power switch to achieve quasi-resonant driving for the main power switch of the flyback converter.

Embodiments of the present invention can advantageously provide several advantages over conventional approaches. For example, the valley moment of the drain-source voltage can be accurately detected to achieve quasi-resonant controlling and driving for the main power switch. This can optimize the controlling and driving circuit to improve performance and reliability, as compared to conventional approaches. Other advantages of the present invention will become readily apparent from the detailed description of preferred embodiments below.

DETAILED DESCRIPTION

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to actively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide several advantages over conventional approaches. For example, the valley moment of the drain-source voltage can be accurately detected to achieve quasi-resonant controlling and driving for the main power switch. This can optimize the controlling and driving circuit to improve performance and reliability, as compared to conventional approaches. The invention, in its various aspects, will be explained in greater detail below with regard to exemplary embodiments.

Figure 1A:
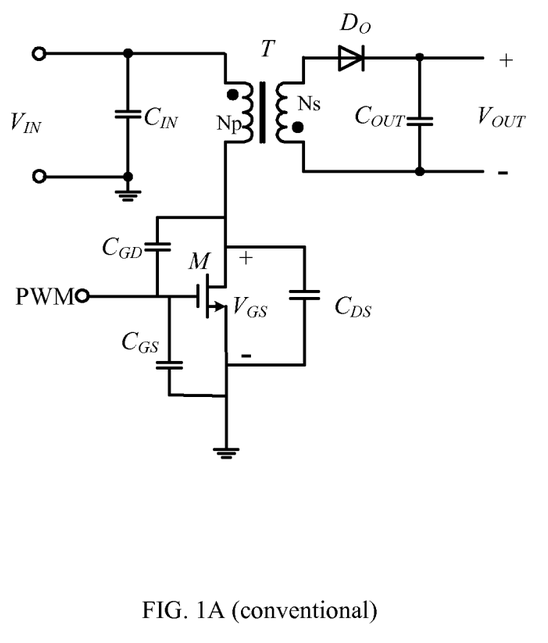
FIG. 1A shows a schematic diagram of an example flyback converter.

A schematic diagram of an example hard-switching flyback converter is shown in FIG. 1A. In this example, main power switch M can be implemented as a MOSFET transistor which includes various parasitic capacitors, such as parasitic capacitor $C_{DS}$ between drain and source, parasitic capacitor $C_{GS}$ between gate and source, and parasitic capacitor $C_{GS}$ between gate and source.

During an interval in which the inductor current of a traditional flyback converter is zero in a discontinuous conduction operation mode, oscillation can occur between a parasitic capacitor of main power switch M and primary inductor L of the transformer T, based on whether the voltage of the parasitic capacitor varies and/or maintains a higher level. At the beginning of the conduction time of a next clock cycle of main power switch M, the parasitic capacitor can discharge through main power switch M to generate a much higher peak current with a mass of harmonic waves that can lead to electromagnetic interference. Also, switching losses may be unavoidable and higher due to the higher voltage of main power switch M at this moment.

Figure 1B:
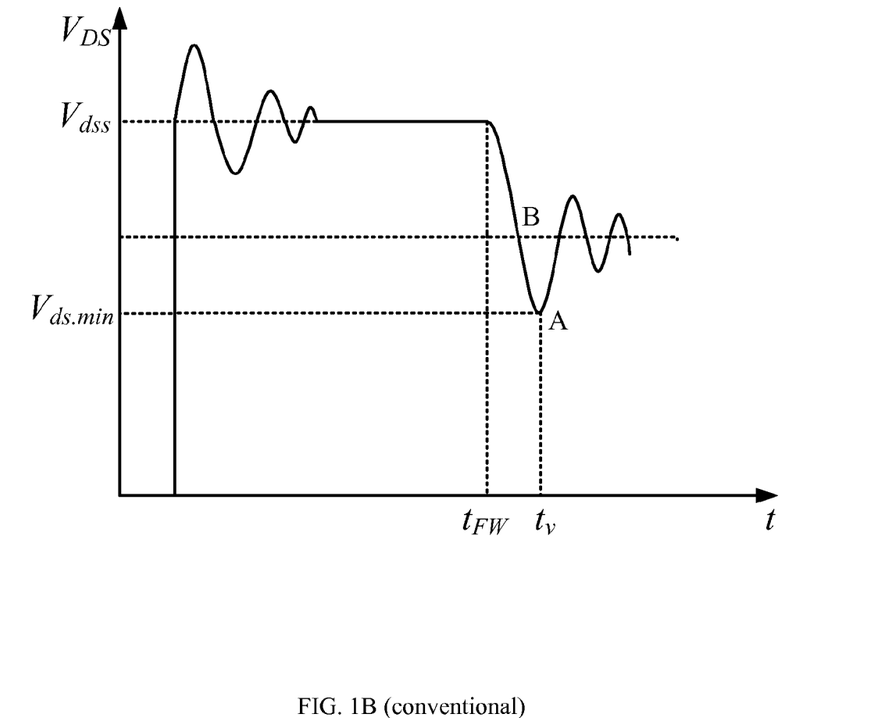
FIG. 1B shows example drain-source voltage waveforms of the main power switch of the flyback converter example of FIG. 1A employing a hard-switching controlling scheme.

With reference to FIG. 1B, an example waveform of drain-source voltage $V_{DS}$ of main power switch M of the flyback converter shown in FIG. 1A is shown. In this example, after the main power switch M is shut off, a peak voltage can be generated between the two terminals of main power switch M due to the oscillation between the parasitic capacitor and the leakage inductor of the transformer. The amplitude can decay to zero after a few cycles, and the drain-source voltage $V_{DS}$ is maintained substantially constant, with a value as shown in following Equation 1.

$$V_{dss} = V_{in} + n(V_{out} + V_f) \quad (1)$$

Here, n is representative of a turn ratio of transformer T, $V_{out}$ is representative of an output voltage, and $V_f$ is representative of a conduction voltage drop of secondary rectifying diode $D_o$.

After the interval $t_{FW}$, the energy made being completely transferred to the load, and current through rectifying diode $D_o$ can decay to zero, which is then turned off. In this example, a voltage of the primary side of transformer T may not be clamped to $n(V_{out}+V_f)$. An RLC resonant circuit may be formed by parasitic capacitor $C_{GD}$, primary inductor $N_p$, and circuit resistor $R_p$, and oscillation of the drain-source voltage of main power switch M can occur. The value of valley A of this oscillation can be calculated as in Equation 2 below.

$$V_{ds,min} = V_{in} - n(V_{out} + V_f) \quad (2)$$

If at moment $t_v$, the main power switch M is driven, and $n(V_{out}+V_f)=V_{in}$, zero voltage switching (ZVS) may be achieved. Even though ZVS may not be achieved on the condition of $n(V_{out}+V_f) \leq V_{in}$, conduction losses can be substantially reduced. ZVS may only be related to the parameters of circuits, and can be independent of operation status. Thus, if the main power switch M is turned on at the moment of valley of the oscillation curve of the drain-source voltage $V_{DS}$, the parasitic capacitor can be charged to a minimum voltage and the peak current may be minimized to decrease conduction losses and electromagnetic interference.

Figure 2A:
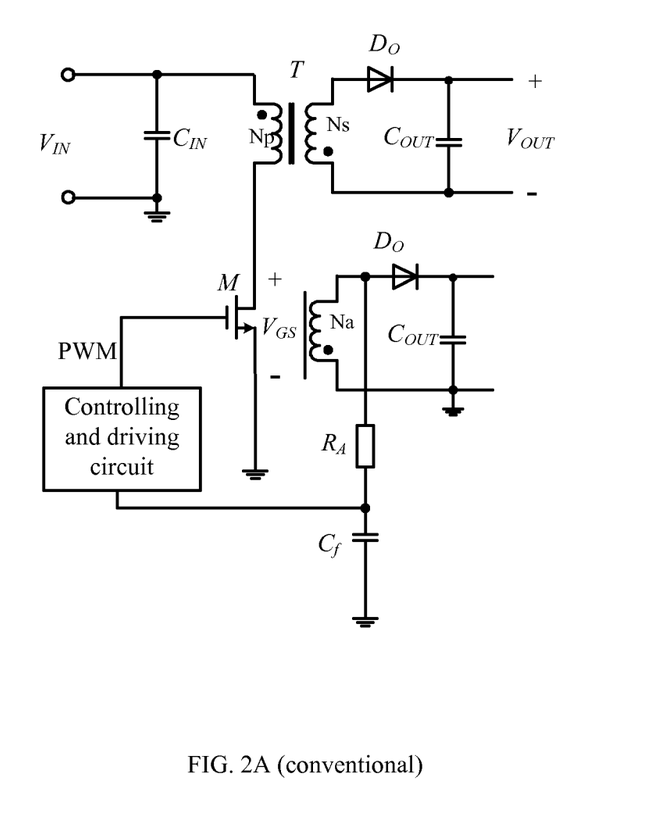
FIG. 2A shows a schematic diagram of a first example flyback converter employing a quasi-resonant soft switching controlling scheme.

With reference to FIG. 2A, a schematic diagram of an example quasi-resonant driving circuit for a flyback converter is shown. An auxiliary winding may be included to detect the primary voltage of the primary winding of transformer T. When the primary voltage crosses zero (e.g., point B of FIG. 1B), main power switch M may be turned on after a delay determined by capacitor $C_f$. In this example, an auxiliary winding can be added and the conduction moment may not be ensured to be the real valley of the drain-source voltage. Drawbacks of this particular approach can include relatively complicated circuit design, higher costs, and inaccurate quasi-resonant driving.

Figure 2B:
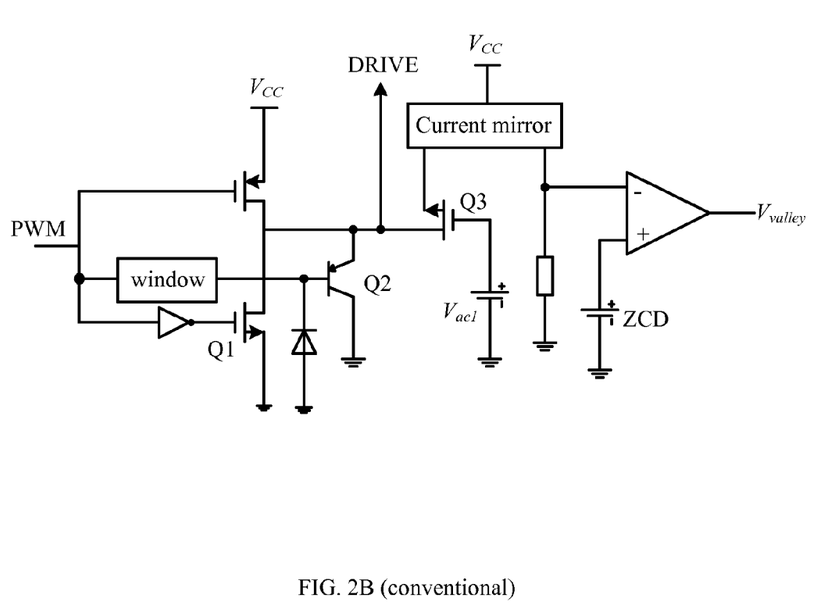
FIG. 2B shows a schematic diagram of a second example flyback converter employing a quasi-resonant soft switching controlling scheme.

With reference to FIG. 2B, a schematic diagram of an example quasi-resonant driving circuit for flyback converters employing a soxyless technical scheme is indicated. A hybrid circuit implemented including MOSFET transistors and a bipolar transistor can be employed to sense negative gate current that is converted to a positive gate current by an active voltage clamp. A valley signal may be generated by detecting the crossing zero condition through a comparator. In this implementation, accurate quasi-resonant driving can be achieved, but the circuit design made be considered more complicated than conventional approaches, and the costs may be higher.

Particular embodiments may provide a controlling and driving circuit and method for flyback converters, implemented by differentiating the drain-source voltage of the main power switch when the main power switch is shut-off, to convert the valley moment to a positive-slope zero-crossing moment of the differential voltage, and through which the valley moment can be accurately detected and quasi-resonant driving can be accurately and advantageously achieved.

A controlling and driving circuit and method for flyback converters in accordance with the embodiments of the present invention may have several advantages. For example, the main power switch can be turned on at the valley moment with minimum drain-source voltage to eliminate peak current and decrease conduction losses. Also, a longer rising time of the drain-source voltage can decrease the drain current when the main power switch is shut off, and the overlap of the drain current and the drain-source voltage may advantageously provide lower turn-off losses and better reliability.

In addition, both the lower peak current and lower rising rate of the drain-source voltage can decrease electromagnetic interference (EMI) to facilitate EMI design and decrease associated costs. Also, for integrated circuit implementations of particular embodiments, a single pin, as opposed to independent pins to detect the drain-source voltage and to drive the main power switch, can be used, thus facilitating packaging and reducing costs.

In particular embodiments, the valley moment of the drain-source voltage can be accurately detected to achieve quasi-resonant controlling and driving for main power switch, which can optimize the controlling and driving circuit to improve the performance and reliability.

In one embodiment, a controlling and driving circuit for a flyback converter, can include: (i) a differentiation circuit configured to receive a third controlling signal and a drain-source voltage of a main power switch of the flyback converter; (ii) where the drain-source voltage is configured to be differentiated by the differentiation circuit to generate a differential voltage when the third controlling signal is active within an interval that the main power switch is shut-off; (iii) a valley voltage detection circuit coupled to the differentiation circuit, and configured to receive the differential voltage; and (iv) where a valley controlling signal is configured to be generated by the valley voltage detection circuit to achieve quasi-resonant driving for the main power switch of the flyback converter when the differential voltage crosses zero with a positive slope.

Figure 3:
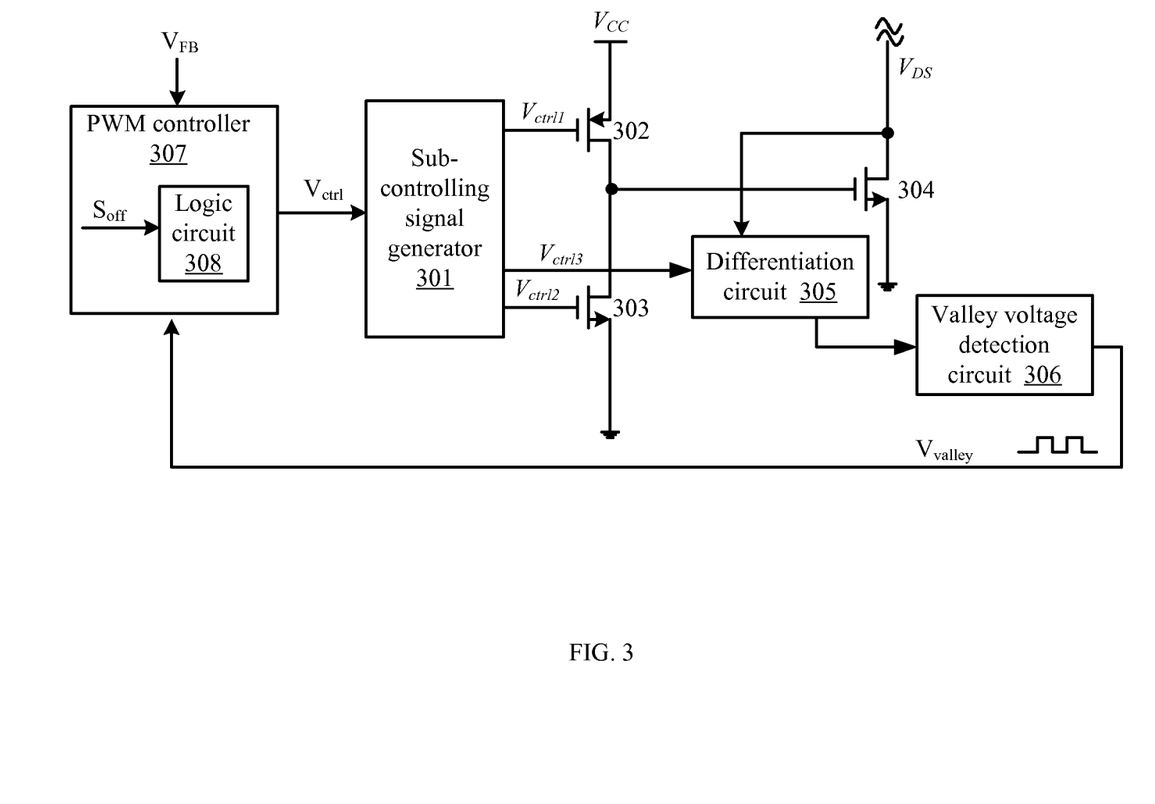
FIG. 3 shows a schematic diagram of a first example controlling and driving circuit for a flyback converter in accordance with embodiments of the present invention.

Referring now to FIG. 3, a schematic diagram of a first example controlling and driving circuit for a flyback converter in accordance with embodiments of the present invention is shown. This example controlling and driving circuit which can include sub-controlling signal generator 301, top power switch 302, bottom power switch 303, main power switch 304, differentiation circuit 305, valley detection circuit 306, and pulse width modulation (PWM) controller 307.

Sub-controlling signal generator 301 can receive main controlling signal $V_{ctrl}$ generated by PWM controller 307 of the flyback converter, to generate first controlling signal $V_{ctrl1}$, second controlling signal $V_{ctrl2}$, and third controlling signal $V_{ctrl3}$. For example, the first, second, and third controlling signals may be generated with a predetermined sequence determined by logical calculations.

Top power switch 302 and bottom power switch 303 may be connected in series between input voltage source $V_{CC}$ and ground to form a push-pull driving circuit, the common node of which can be coupled to the controlling terminal of main power switch 304. Both controlling terminals of top power switch 302 and bottom power switch 303 can be coupled to sub-controlling signal generator 301 to receive first controlling signal $V_{ctrl1}$ and second controlling signal $V_{ctrl2}$. The operation of top power switch 302 maybe controlled by first controlling signal $V_{ctrl1}$, and the operation of bottom power switch 303 may be controlled by second controlling signal $V_{ctrl2}$.

Differentiation circuit 305 can be coupled to sub-controlling signal generator 301 to receive third controlling signal $V_{ctrl3}$ and drain-source voltage $V_{DS}$ of main power switch 304. The operation principle of the controlling and driving circuit of a flyback converter during a switching cycle will be described in detail by taking the example that top power switch 302, bottom power switch 303, and main power switch 304 are implemented as MOSFET transistors, and the enabling logic level is high or true (as opposed to complementary or low going) level.

One switching cycle can be divided into three intervals: a first interval, a second interval, and a third interval, based on the operation of top power switch 302, bottom power switch 303 and differentiation circuit 305. During the first interval, first controlling signal $V_{ctrl1}$ may be at a high level to conduct top power switch 302, and the voltage of the common node of both top power switch 302 and bottom power switch 303 can conduct main power switch 304, the drain-source voltage $V_{DS}$ of which may be about zero. While second controlling signal $V_{ctrl2}$ and third controlling signal $V_{ctrl3}$ are at a low level, both bottom power switch 303 and differentiation circuit may be off, disabled, or out of operation.

During the second interval, first controlling signal $V_{ctrl1}$ may be converted to a low level to turn off top power switch 302, and second controlling signal $V_{ctrl2}$ maybe at a high level to turn on bottom power switch 303 to shut off main power switch 304. Also, the second interval can exclude at least one valley moment of the drain-source voltage.

At the beginning of the third interval, first controlling signal $V_{ctrl1}$ may remain at a low level, while second controlling signal $V_{ctrl2}$ can be converted to a low level to turn off bottom power switch 303. The duration of high level status of third controlling signal $V_{ctrl3}$ may not be more than the remaining interval of a switching cycle excluding the first interval. For example, it may be: (i) consistent with the third interval, or (ii) the beginning may be in conformity with beginning of the second interval, and the end may be in conformity with the end of the present switching cycle, or (iii) the beginning may be behind the beginning of second interval by a delay (such as $t_d$), and the end may be in conformity with the end of the present switching cycle.

The duration of high level status of third controlling signal $V_{ctrl3}$ may be long enough to ensure that at least one valley of drain-source voltage $V_{DS}$ can be detected when second controlling signal $V_{ctrl2}$ is at a low level. When third controlling signal $V_{ctrl3}$ is at a high level, differentiation circuit 305 can be enabled to differentiate the drain-source voltage $V_{DS}$ to generate a differential voltage. Differentiation circuit 305 may include an enabling circuit, a resistor, and a capacitor coupled in series between drain of main power switch 304 and ground, through which the valley moment can be converted to positive crossing-zero moment of the differential voltage.

In addition, a first dead time after the first interval, and a second dead time after being third interval may be included to eliminate shoot-through of top power switch 302 and bottom power switch 303, as well as differentiation circuit 305 and top power switch 302. Valley voltage detection circuit 306 may be coupled to differentiation circuit 305 to receive the differential voltage. When the differential voltage crosses zero with a positive slope (e.g., $V_{DS}$ reaches the valley voltage), valley controlling signal $V_{valley}$ can be generated by valley detection circuit 306.

PWM controller 307 may be used to generate controlling signal $V_{ctrl1}$ based on valley controlling signal $V_{valley}$ and a shut-off signal $S_{off}$ that may be generated in accordance with a feedback voltage $V_{FB}$ representative of the output voltage of the flyback converter. The valley controlling signal can trigger the main controlling signal $V_{ctrl}$ to be active, and after a conduction time, the shut-off signal $S_{off}$ can flip the main controlling signal $V_{ctrl}$ to be inactive.

As used herein, a controlling signal may be "active" or "activated" (e.g., in a logic high or low state) when a corresponding power switch is turned on, or when the signal is activated to enable other circuitry. Similarly, a controlling signal may be "inactive" (e.g., in a logic low or high state) when a corresponding power switch is turned off, or when the signal is activated to disable other circuitry. For example, first controlling signal $V_{ctrl1}$ may turn on top power switch 302 when activated, and may turn off top power switch 302 when inactive. Of course, other types of control (e.g., different logic states, current-based control, etc.) can also be accommodated in particular embodiments.

For the example controlling and driving circuit of a flyback converter of FIG. 3, the valley moment of the drain-source voltage can be detected accurately by the differential operation for the drain-source voltage when the main power switch is off to achieve quasi-resonant soft switching driving for main power switch. Also, main power switch 304 can be turned on at any valley moment, such as the first valley moment, the second valley moment, or other valley moments. In addition, the length of the third interval can be set in accordance with the drain-source voltage to ensure that at least one valley can be detected. Further, any suitable types of switches can be selected as the power switches in particular embodiments.

Figure 4:
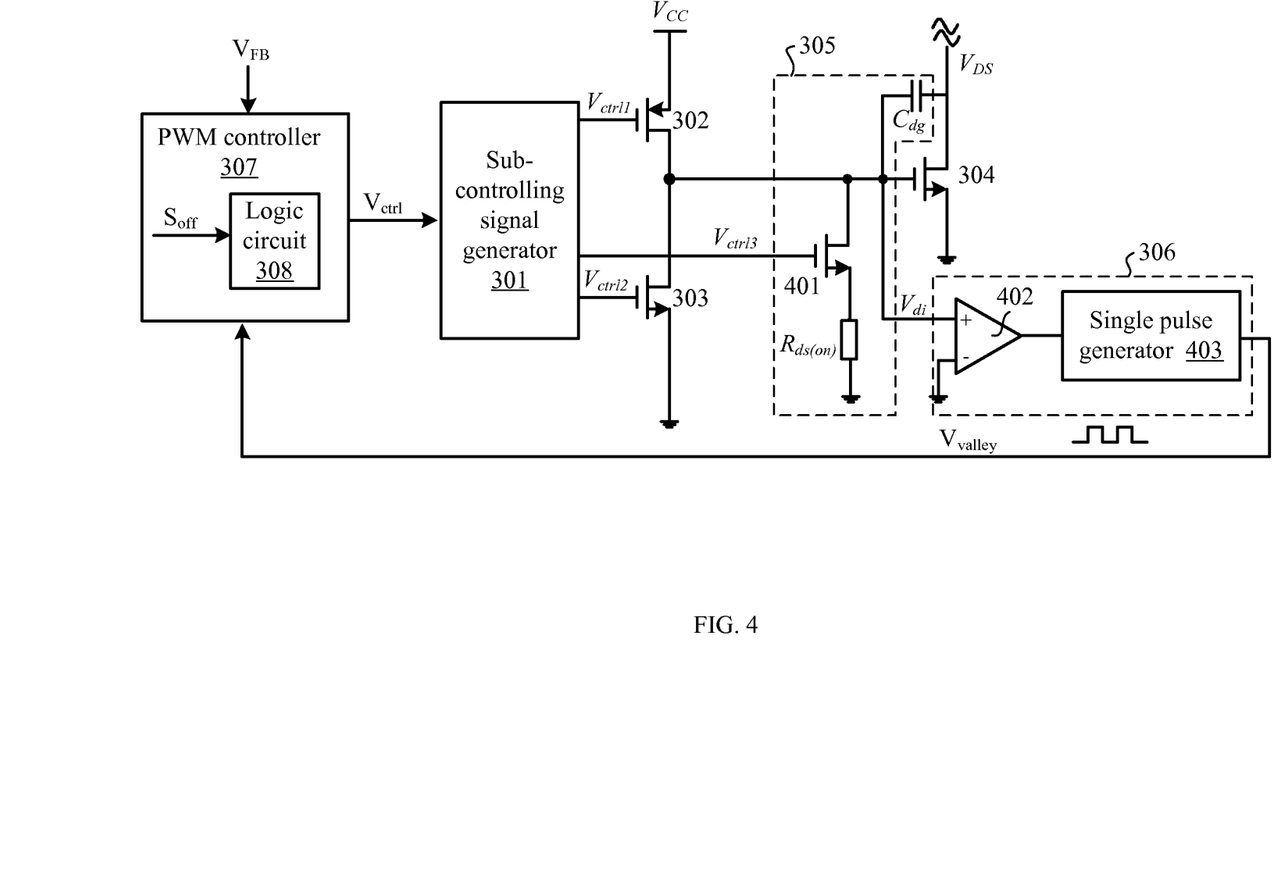
FIG. 4 shows a schematic diagram of a second example controlling and driving circuit for a flyback converter in accordance with embodiments of the present invention.

Referring now to FIG. 4, shown is a schematic diagram of a second example controlling and driving circuit for a flyback converter in accordance with embodiments of the present invention. This particular example shows one implementation of differentiation circuit 305 and valley detection circuit 306 from FIG. 3. In FIG. 4, sub-controlling signal generator 301, push-pull driving circuit including top power switch 302 and bottom power switch 303, and PWM controller 307 have substantially the same structure and operation principle as the embodiment shown in FIG. 3.

Differentiation circuit 305 can be implemented by power switch 401, on-resistor $R_{ds(on)}$ of auxiliary power switch 401, and intrinsic body capacitor $C_{dg}$ (capacitor between gate and drain) of main power switch 304. For example, auxiliary power switch 401 may be an N-type MOSFET transistor with a gate coupled to sub-controlling signal generator 301 to receive third controlling signal $V_{ctrl3}$, a drain coupled to a common node of top power switch 302, bottom power switch 303, and a controlling terminal of main power switch 304, and a source coupled to ground. The switching operation of auxiliary power switch 401 may be controlled by third controlling signal $V_{ctrl3}$.

When auxiliary power switch 401 is turned on, the differentiation operation may be enabled for drain-source voltage $V_{DS}$ of main power switch 304 by the differentiation circuit 305 to generate a corresponding differential voltage $V_{di}$. Through differential voltage $V_{di}$, the valley moment of drain-source voltage $V_{DS}$ may be converted to a positive-slope crossing zero moment of differential voltage $V_{di}$.

Valley detection circuit 306 can include a zero voltage comparator 402 and a single pulse generator 403. The non-inverting input terminal of zero voltage comparator 402 can receive differential voltage $V_{di}$, and the inverting input terminal may be coupled to ground. The output terminal of comparator 402 may be coupled to single pulse generator 403.

When differential voltage $V_{di}$ crosses zero with a positive slope, the output of zero voltage comparator 402 can trigger single pulse generator 403 to generate a single pulse. This single pulse signal can be employed as the valley controlling signal $V_{valley}$ to control the controlling and driving circuit to drive main power switch 304 at substantially this moment.

Figure 5:
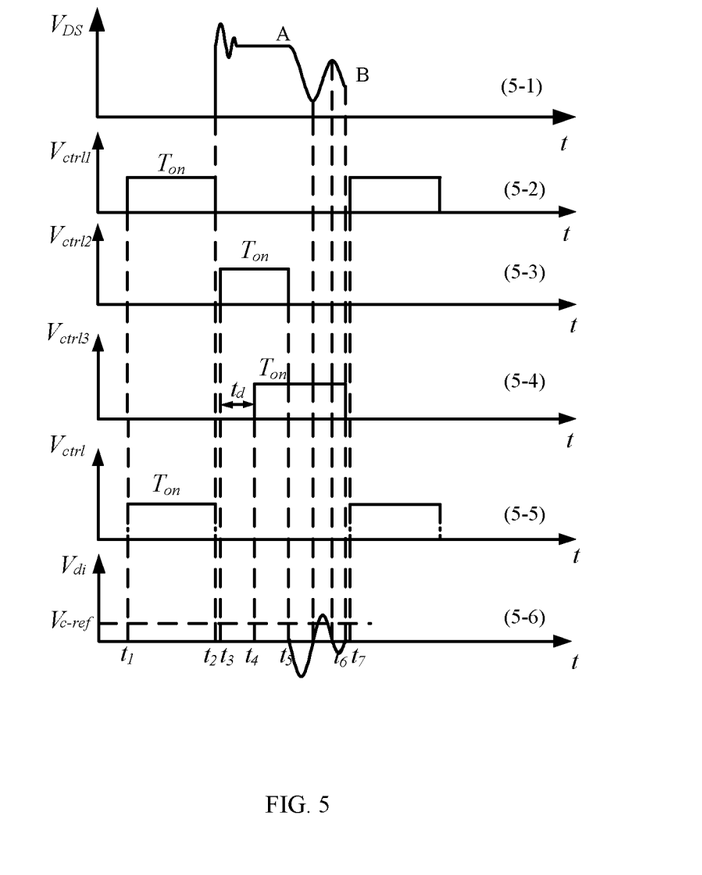
FIG. 5 shows example operation waveforms of the controlling and driving circuit for the flyback converter of FIG. 4.

Example operation of the controlling and driving circuit for the flyback converter in FIG. 4 will be described in conjunction with FIG. 5 that shows example operation waveforms for the example circuit of FIG. 4. In the example of FIG. 5, one switching cycle of the flyback converter may include various intervals, delays, and/or dead times.

For example, during a first interval (e.g., $t_1$-$t_2$) of a switching cycle, moment $t_1$ to moment $t_2$, first controlling signal $V_{ctrl1}$ may be at a high level to drive top power switch 304 to conduct, the drain-source voltage $V_{DS}$ of which may be almost zero. Second controlling signal $V_{ctrl2}$ and third controlling signal $V_{ctrl3}$ may be at a low level during this time to control bottom power switch 303 and auxiliary power switch 401 in a shut-off or disabled condition.

At moment $t_2$, first controlling signal $V_{ctrl1}$ may be converted from a high level to a low level to turn off top power switch 302 and main power switch 304. When the inductor current of the transformer of the flyback converter decreases to zero, oscillation between intrinsic capacitor $C_{dg}$ of main power switch 304 and the inductor of the transformer of the flyback converter can occur. Correspondingly, the drain-source voltage $V_{DS}$ of main power switch 304 may be represented as a voltage waveform with oscillation (see, e.g., FIG. 1B). After a relatively short dead time from moment $t_2$ to moment $t_3$, second controlling signal $V_{ctrl3}$ may be converted from a low level to a high level to conduct bottom power switch 303.

During a second interval (e.g., $t_3$-$t_5$, from moment $t_3$ to moment $t_5$), second controlling signal $V_{ctrl2}$ can maintain at a high level to control bottom power switch 303 in a conduction or enabled status. At moment $t_5$, second controlling signal $V_{ctrl2}$ can be converted from a high level to a low level to turn off bottom power switch 303. The moment of turning off bottom power switch 303 can be set in order to guarantee occurrence before the valley moment.

After a delay $t_d$ from the turning on of bottom power switch 303, third controlling signal $V_{ctrl3}$ may be converted from a low level to a high level at moment $t_4$ to turn on auxiliary power switch 401. The delay $t_d$ can be predetermined and set correspondingly.

From moment $t_4$ to moment $t_5$, both third controlling signal $V_{ctrl3}$ and second controlling signal $V_{ctrl2}$ may be at high levels to control auxiliary power switch 401 and bottom power switch 303 enabled or in a conduction status. From moment $t_5$ to moment $t_6$ (e.g., a third interval), bottom power switch 303 may be turned off, while auxiliary power switch 401 can be in a conduction or enabled status. Also, drain-source voltage $V_{DS}$ of main power switch 304 can be differentiated accurately by differentiation circuit 305 to generate a differential voltage $V_{di}$, the waveform of which is indicated as waveform (5-6).

In particular embodiments, if the second valley of drain-source voltage $V_{DS}$ is active, at moment $t_6$, drain-source voltage $V_{DS}$ may reach to the second valley, and differential voltage $V_{di}$ can cross zero with a positive slope. In this case, a single pulse may then be generated by single pulse generator 403 at moment $t_7$ to control main power switch 304 to be turned on again after a second dead time. Then, the next switching cycle begins.

In particular embodiments, for the controlling and driving circuit of the flyback converter of FIG. 4, the drain-source voltage of main power switch 304 can be differentiated by a differentiation circuit including an intrinsic body capacitor of main power switch 304 and an on-resistor of auxiliary power switch 401 to detect the valley moment accurately to achieve quasi-resonant soft switching driving for the main power switch 304. The differentiation circuit can be simplified and optimized by the various implementations described herein.

In particular embodiments, an additional capacitor can be arranged between the gate and drain of main power switch 304, and an additional resistor can also be arranged coupled in series with a source of auxiliary power switch 401 to form differentiation circuit 305. Of course, other arrangements in circuitry for differentiation circuit 305 can also be accommodated in particular embodiments.

Figure 6:
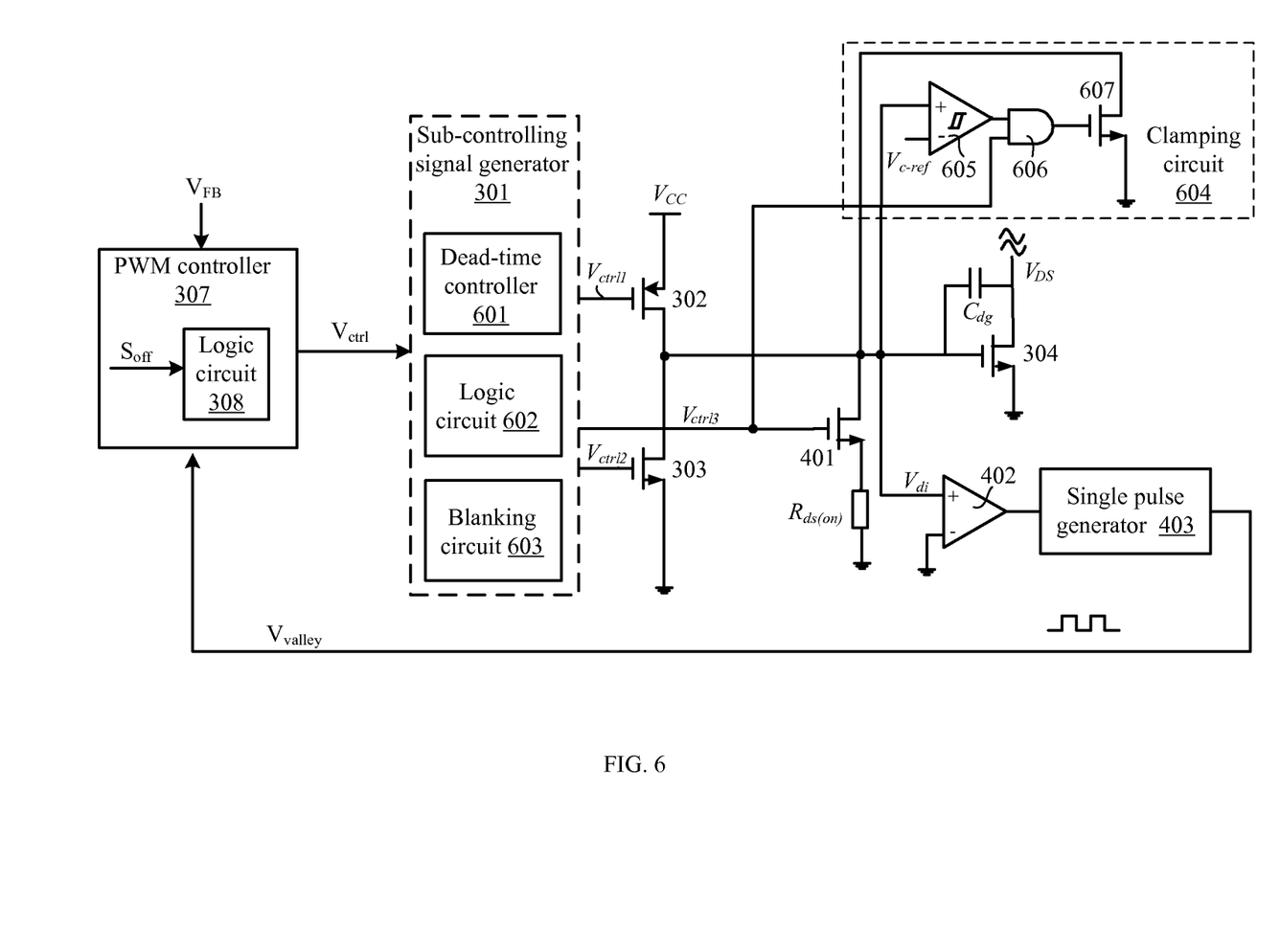
FIG. 6 shows a schematic diagram of a third example controlling and driving circuit for a flyback converter in accordance with embodiments of the present invention.

Referring now to FIG. 6, shown is an example of a controlling and driving circuit for a flyback converter in accordance with embodiments of the present invention. Here, sub-controlling signal generator 301 can include dead-time controller 601, logic circuit 602, and blanking circuit 603. In addition, clamping circuit 604 may be included as additional circuitry to the example discussed above with reference to FIG. 4.

A first dead time between first controlling signal $V_{ctrl1}$ and second controlling signal $V_{ctrl2}$, and a second dead time between first controlling signal $V_{ctrl1}$ and third controlling signal $V_{ctrl3}$, may be determined by dead-time controller 601. Logic circuit 602 can be used to generate first controlling signal $V_{ctrl1}$, second controlling signal $V_{ctrl2}$, and third controlling signal $V_{ctrl3}$ with a predetermined sequence in accordance with main controlling signal $V_{ctrl}$ of the flyback converter. Blanking circuit 603 may be used to delay conduction of differentiation circuit 305 after bottom power switch 303 begins to conduct (e.g., when second controlling signal $V_{ctrl2}$ is active during a switching cycle).

As shown in example waveform (5-6) in FIG. 5, during the third interval, in view of the variation of differential voltage $V_{di}$, clamping circuit 604 can be used to avoid the mistaken conduction of main power switch 304. Clamping circuit 604 can include hysteresis comparator 605, AND-gate 606, and clamping transistor 607. The non-inverting input terminal of hysteresis comparator 605 can receive clamping reference voltage $V_{c\_ref}$, while the inverting input terminal can receive the voltage of the controlling terminal of main power switch 304. AND-gate 606 can receive both output of hysteresis comparator 605 and third controlling signal $V_{ctrl3}$. The controlling terminal of clamping transistor 607 may be coupled to an output of AND-gate 606, and the drain of clamping transistor 607 may be coupled to the controlling terminal of main power switch 304, while the source of clamping transistor 607 may be coupled to ground.

During the third interval, when the voltage of controlling terminal of main power switch 304 is higher than clamping reference voltage $V_{c\_ref}$, the output of hysteresis comparator 605 may be at high level. Also, third controlling signal can be at a high level, thus the output of AND-gate 606 may be at a high level to turn on clamping transistor 607. The voltage of controlling terminal of main power switch 304 may then be clamped to the clamping reference voltage to avoid the mistaken conduction of main power switch 304.

An example controlling and driving method for a flyback converter in accordance with embodiments of the present invention will be described in conjunction with the following figures. In one embodiment, a method of controlling and driving for a flyback converter, can include: (i) differentiating a drain-source voltage of a main power switch of the flyback converter to generate a differential voltage when a third controlling signal is active and the main power switch is shut-off; (ii) detecting the differential voltage; (iii) generating a valley controlling signal when the differential voltage crosses zero with positive slope; and (iv) turning on the main power switch to achieve quasi-resonant driving for the main power switch of the flyback converter.

Figure 7:
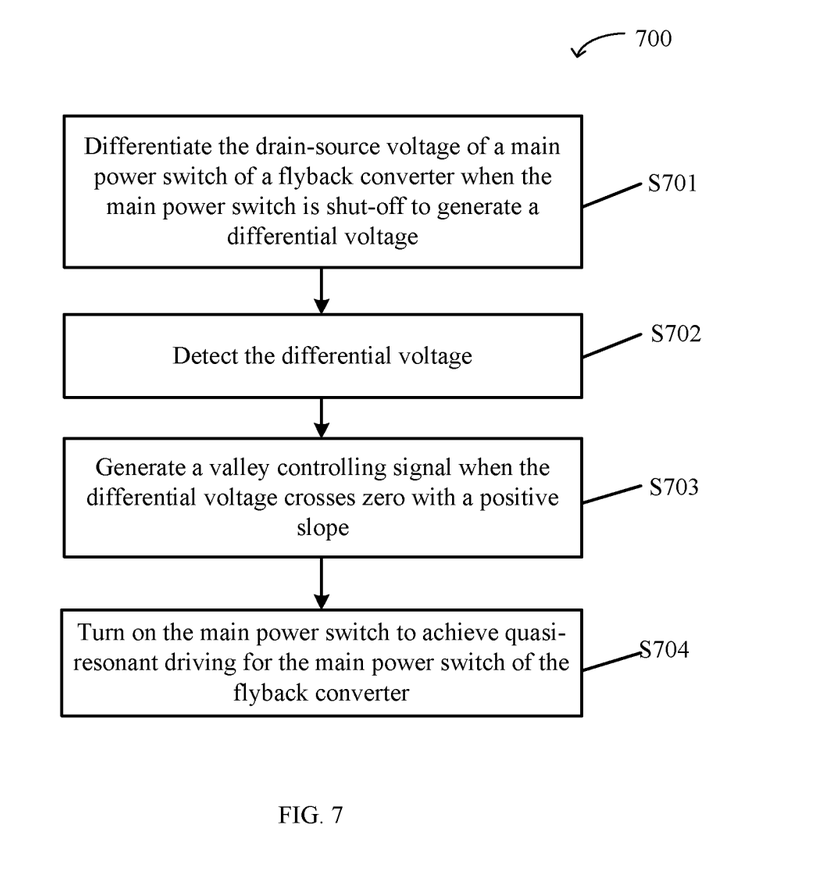
FIG. 7 shows a flow chart of an example controlling and driving method for a flyback converter in accordance with embodiments of the present invention.

Referring now to FIG. 7, the flow chart 700 of one example controlling and driving method for a flyback converter in accordance with embodiments of the present invention is shown. At S701, the drain-source voltage of the main power switch of the flyback converter can be differentiated when the main power switch is shut-off to generate a differential voltage. At S702, the differential voltage may be detected. At S703, a valley controlling signal may be generated when the differential voltage crosses zero with positive slope. At S704, the main power switch may be turned on to achieve quasi-resonant driving for the main power switch of the flyback converter.

Furthermore, an example controlling and driving method may also include: (i) generating a main controlling signal in accordance with the valley controlling signal and a shut-off signal; (ii) generating a first controlling signal, a second controlling signal, and a third controlling signal in accordance with received the controlling signal of the flyback converter; (iii) driving the main power switch to conduct by a top power switch of a push-pull driving circuit when the first controlling signal is active; (iv) shutting off the main power switch by a bottom power switch of the push-pull driving circuit controlled by the second controlling signal when the first controlling signal is inactive; (v) when the third controlling signal is active, differentiating the drain-source voltage of the main power switch; (vi) wherein in one switching cycle, when the controlling signal is active, the first controlling signal is active during a first interval of one switching cycle, and is inactive during a first remaining interval of the one switching cycle; (vii) the second controlling signal is active during a second interval of the one switching cycle when the controlling signal is inactive, and is inactive during a second remaining interval of the one switching cycle; and (viii) the third controlling signal is active during a third interval that is not more than the first remaining interval of the one switching cycle.

Also, the second interval can exclude at least one valley moment of the drain-source voltage, and the third interval may include at least the valley moment of drain-source voltage. The example controlling and driving method may also further include: (i) avoiding active status for both the first controlling signal and the second controlling signal during a first dead time; and (ii) avoiding active status for both the first controlling signal and the second controlling signal during a second dead time.

The example controlling and driving method can also include: (i) comparing the voltage of the controlling terminal of the main power switch against a clamping voltage; and (ii) clamping the voltage of the controlling terminal of the main power switch to a clamping voltage when the third controlling signal is active such that the voltage of the controlling terminal of the main power switch does not go higher than the clamping voltage. In addition, differentiation of the drain-source voltage can be implemented by a differentiation circuit (e.g., 305) that includes the body gate-drain capacitor of the main power switch and on-resistor of an auxiliary power switch.

In one embodiment, a quasi-resonant soft-switching flyback converter, can include: (i) a controlling and driving circuit as above; and (ii) a flyback power stage including the main power switch, a transformer having primary and secondary windings, and an output diode, where the flyback power stage is configured to generate an output voltage at an output terminal in accordance with an input voltage.

Figure 8:
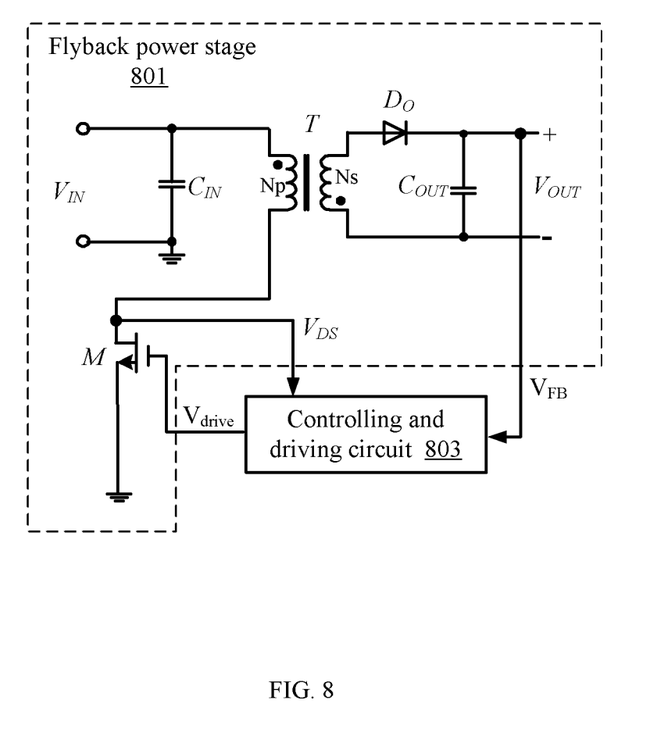
FIG. 8 shows a schematic diagram of an example quasi-resonant soft switching flyback converter in accordance with embodiments of the present invention.

Referring now to FIG. 8, shown is a schematic diagram of an example quasi-resonant soft-switching flyback converter in accordance with embodiments of the present invention. This example flyback converter can include flyback power stage 801 and controlling and driving circuit 802. Controlling and driving circuit 802 may be, e.g., one of the examples shown and discussed above with reference to FIGS. 3-6.

Flyback power stage 801 can include main power switch M, transformer T having a primary winding and a secondary winding, output diode $D_o$, and output capacitor $C_{OUT}$. This arrangement may be utilised to generate an output voltage $V_{OUT}$ in accordance with received input voltage $V_{IN}$. Input capacitor $C_{IN}$ can be employed to filter input voltage $V_{IN}$.

Controlling and driving circuit 802 may be configured to differentiate the drain-source voltage $V_{DS}$ of the main power switch M to generate a differential voltage. When the differential voltage crosses zero with positive slope, a valley controlling signal can be generated to achieve quasi-resonant driving for the main power switch M of the flyback converter.

The foregoing descriptions of specific embodiments of the present invention have been presented through images and text for purpose of illustration and description of the quasi-resonant controlling and driving circuit and method. They are not intended to be exhaustive or to limit the invention to the precise forms disclosed, and obviously many modifications and variations are possible in light of the above teaching, such as different implementations of the differentiating circuit and enabling signal generator.

The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A controlling and driving circuit for a flyback converter, the controlling and driving circuit comprising:
    a) a differentiation circuit configured to receive a third controlling signal and a drain-source voltage of a main power switch of said flyback converter, wherein said drain-source voltage is configured to be differentiated by said differentiation circuit to generate a differential voltage when said third controlling signal is active within an interval that said main power switch is shut-off;
    b) a valley voltage detection circuit coupled to said differentiation circuit, said valley voltage detection circuit being configured to receive said differential voltage, and to generate a valley controlling signal to achieve quasi-resonant driving for said main power switch of said flyback converter when said differential voltage crosses zero with a positive slope; and
    c) said differentiation circuit comprising an enabling circuit configured to receive said third controlling signal, a differentiation capacitor and a differentiation resistor coupled between a drain of said main power switch and ground, wherein a common node of said differentiation capacitor and said differentiation resistor is coupled to a controlling terminal of said main power switch, and wherein said enabling circuit is configured to enable said differentiation capacitor and said differentiation resistor to differentiate said drain-source voltage when said third controlling signal is active.

2. The controlling and driving circuit of claim 1, further comprising:
    a) a controlling circuit configured to receive said valley controlling signal and a shut-off signal, and to generate a main controlling signal;
    b) a sub-controlling signal generator configured to generate a first controlling signal, a second controlling signal, and said third controlling signal based on said main controlling signal;
    c) a push-pull driving circuit comprising a top power switch controlled by said first controlling signal, and a bottom power switch controlled by said second controlling signal, wherein said top and bottom power switches are coupled in series between a voltage source and ground, and wherein a common node of said top and bottom power switches is coupled to said controlling terminal of said main power switch;
    d) wherein, in one switching cycle, when said main controlling signal is active, said first controlling signal is active during a first interval of said one switching cycle, and said first controlling signal is inactive during a first remaining interval of said one switching cycle;
    e) wherein said second controlling signal is active during a second interval of said one switching cycle when said main controlling signal is inactive, and said second controlling signal is inactive during a second remaining interval of said one switching cycle; and
    f) wherein said third controlling signal is active during a third interval of said one switching cycle, said third interval being not more than said first remaining interval.

3. The controlling and driving circuit of claim 2, wherein said second interval excludes at least one valley moment of said drain-source voltage, and wherein said third interval includes said at least one valley moment of said drain-source voltage.

4. The controlling and driving circuit of claim 2, wherein said one switching cycle comprises first and second dead times, wherein said first controlling signal and said second controlling signal are inactive during said first dead time, and wherein said first controlling signal and said third controlling signal are inactive during said second dead time.

5. The controlling and driving circuit of claim 2, wherein said sub-controlling signal generator comprises a dead-time controller, a blanking circuit, and a logic circuit.

6. The controlling and driving circuit of claim 2, wherein said differentiation circuit comprises an auxiliary power switch having a controlling terminal coupled to said sub-controlling signal generator to receive said third controlling signal, wherein a first terminal of said auxiliary power switch is coupled to said controlling terminal of said main power switch, and a second terminal of said auxiliary power switch is coupled to ground.

7. The controlling and driving circuit of claim 6, wherein said auxiliary power switch comprises a MOSFET transistor, wherein a body drain-gate capacitor of said main power switch and an on-resistor of said auxiliary power switch are configured to differentiate said drain-source voltage when said third controlling signal is active.

8. A quasi-resonant soft-switching flyback converter, comprising:
    a) the controlling and driving circuit of claim 1; and
    b) a flyback power stage comprising said main power switch, a transformer having primary and secondary windings, and an output diode, wherein said flyback power stage is configured to generate an output voltage at an output terminal in accordance with an input voltage.

9. The controlling and driving circuit of claim 1, wherein said valley voltage detection circuit comprises:

a) a zero-crossing comparator having an inverting input terminal coupled to ground, and a non-inverting input terminal coupled to receive said differential voltage; and b) a single pulse generator coupled to an output terminal of said zero-crossing comparator, said single pulse generator being configured to generate said valley controlling signal.

10. The controlling and driving circuit of claim 1, further comprising a clamping circuit coupled to a controlling terminal of said main power switch, wherein a voltage of said controlling terminal is configured to be clamped by said clamping circuit to a clamping voltage to disallow said controlling terminal of said main power switch from going higher than said clamping voltage.

11. The controlling and driving circuit of claim 10, wherein said clamping circuit comprises:

a) a comparator having an inverting input terminal configured to receive said clamping voltage, and a non-inverting input terminal configured to receive said voltage of said controlling terminal;

b) an AND-gate configured to receive an output signal of said comparator and said third controlling signal;

c) a clamping transistor having a controlling terminal of coupled to an output terminal of said AND-gate, wherein a first terminal of said clamping transistor is coupled to said controlling terminal of said main power switch, and a second terminal of said clamping transistor is coupled to ground; and d) wherein said clamping transistor is configured to be turned on to clamp said voltage of said controlling terminal of said main power switch to said clamping voltage when said third controlling signal is active and to disallow said controlling terminal of said main power switch from going higher than said clamping voltage.

12. A method of controlling and driving for a flyback converter, the method comprising:

a) differentiating a drain-source voltage of a main power switch of said flyback converter to generate a differential voltage when a third controlling signal is active and said main power switch is shut-off;

b) detecting said differential voltage;

c) generating a valley controlling signal when said differential voltage crosses zero with positive slope;

d) turning on said main power switch to achieve quasi-resonant driving for said main power switch of said flyback converter;

e) comparing a voltage of a controlling terminal of said main power switch against a clamping voltage; and f) when said voltage of said controlling terminal of said main power switch is higher than said clamping voltage and said third controlling signal is active, clamping said voltage of said controlling terminal of said main power switch to said clamping voltage.

13. The method of claim 12, further comprising:

a) generating a main controlling signal in response to said valley controlling signal and a shut-off signal based on a feedback of an output voltage of said flyback converter;

b) generating a first controlling signal, a second controlling signal, and said third controlling signal in response to said main controlling signal;

c) driving said main power switch to conduct by a top power switch of a push-pull driving circuit when said first controlling signal is active;

d) shutting off said main power switch by a bottom power switch of said push-pull driving circuit using said second controlling signal when said first controlling signal is inactive;

e) wherein, in one switching cycle, when said main controlling signal is active, said first controlling signal is active during a first interval of said one switching cycle, and said first controlling signal is inactive during a first remaining interval of said one switching cycle;

f) wherein said second controlling signal is active during a second interval of said one switching cycle when said main controlling signal is inactive, and said second controlling signal is inactive during a second remaining interval of said one switching cycle; and g) wherein said third controlling signal is active during a third interval of said one switching cycle, said third interval being not more than said first remaining interval.

14. The method of claim 13, wherein said second interval excludes at least one valley moment of said drain-source voltage, and wherein said third interval includes said at least one valley moment of said drain-source voltage.

15. The method of claim 13, further comprising:

a) using a first dead time in said one switching cycle such that said first controlling signal and said second controlling signal are inactive during said first dead time; and b) using a second dead time in said one switching cycle such that said first controlling signal and said third controlling signal are inactive during said second dead time.

16. The method of claim 12, further comprising differentiating, by a differentiation circuit, said drain-source voltage, wherein said differentiation circuit comprises a body gate-drain capacitor and an on-resistor of an auxiliary transistor.

* * * * *